United States Patent
Shvodian

(10) Patent No.: US 7,088,702 B2
(45) Date of Patent: Aug. 8, 2006

(54) METHOD FOR CONTROLLING A DATA STREAM IN A WIRELESS NETWORK

(75) Inventor: William M. Shvodian, McLean, VA (US)

(73) Assignee: Freescale Semiconductor Inc., Austin, TX (US)

(*) Notice: Subject to any disclaimer, the term of this patent is extended or adjusted under 35 U.S.C. 154(b) by 250 days.

(21) Appl. No.: 10/680,489

(22) Filed: Oct. 8, 2003

(65) Prior Publication Data

US 2004/0072573 A1   Apr. 15, 2004

Related U.S. Application Data

(63) Continuation-in-part of application No. 10/262,946, filed on Oct. 3, 2002.

(60) Provisional application No. 60/326,425, filed on Oct. 3, 2001, provisional application No. 60/416,520, filed on Oct. 8, 2002.

(51) Int. Cl.
  *H04Q 7/20* (2006.01)
  *H04B 7/00* (2006.01)

(52) U.S. Cl. .............. 370/348; 455/450; 455/423; 455/434; 455/422; 370/347; 370/442; 370/443; 370/326

(58) Field of Classification Search ........... 455/423, 455/434, 450, 422; 370/348, 347, 442, 443, 370/328, 337; 709/249, 226
See application file for complete search history.

(56) References Cited

U.S. PATENT DOCUMENTS

| | | | | |
|---|---|---|---|---|
| 6,052,594 A * | 4/2000 | Chuang et al. | ............. | 455/450 |
| 6,452,915 B1 * | 9/2002 | Jorgensen | ............. | 370/338 |
| 6,590,885 B1 * | 7/2003 | Jorgensen | ............. | 370/338 |
| 6,594,246 B1 * | 7/2003 | Jorgensen | ............. | 370/338 |
| 6,597,682 B1 * | 7/2003 | Kari | ............. | 370/348 |
| 6,597,683 B1 * | 7/2003 | Gehring et al. | ............. | 370/348 |
| 6,628,629 B1 * | 9/2003 | Jorgensen | ............. | 370/322 |
| 6,640,248 B1 * | 10/2003 | Jorgensen | ............. | 709/226 |
| 6,680,922 B1 * | 1/2004 | Jorgensen | ............. | 370/328 |
| 6,862,622 B1 * | 3/2005 | Jorgensen | ............. | 709/226 |
| 2001/0030956 A1 * | 10/2001 | Chillariga et al. | ............. | 370/348 |
| 2002/0090939 A1 * | 7/2002 | Howard | ............. | 455/422 |
| 2002/0099854 A1 * | 7/2002 | Jorgensen | ............. | 709/249 |
| 2003/0003905 A1 * | 1/2003 | Shvodian | ............. | 455/423 |
| 2003/0063619 A1 * | 4/2003 | Montano et al. | ............. | 370/443 |
| 2003/0137966 A1 * | 7/2003 | Odman et al. | ............. | 370/347 |
| 2003/0199272 A1 * | 10/2003 | Shvodian et al. | ............. | 455/434 |
| 2004/0013127 A1 * | 1/2004 | Shvodian | ............. | 370/442 |
| 2004/0114563 A1 * | 6/2004 | Shvodian | ............. | 370/347 |

* cited by examiner

*Primary Examiner*—Duc Nguyen
*Assistant Examiner*—Michael T. Vu
(74) *Attorney, Agent, or Firm*—Posz Law Group, PLC

(57) ABSTRACT

A method is provided for transmitting data packets from a source device in a wireless network. The source device receives a channel time allocation identifying the source device as assigned to transmit and a destination device as assigned to listen during the channel time allocation. If the source device has any primary data to send to the destination device, it will do so during the channel time allocation. If time remains in the channel time allocation once the primary data (if any) has been sent to the destination device, the source device will determine whether it has any secondary data to send to a secondary device. If so, the source device will determine whether the secondary device will be listening during the channel time allocation. If the secondary device will be listening, the source device then sends the secondary data to the secondary device during the channel time allocation.

12 Claims, 10 Drawing Sheets

METHOD FOR CONTROLLING A DATA STREAM IN A WIRELESS NETWORK

RELATED APPLICATION

This application is a continuation-in-part of U.S. application Ser. No. 10/262,946, filed Oct. 3, 2002, entitled "METHOD OF OPERATING A MEDIA ACCESS CONTROLLER", which benefits from the priority of a provisional application No. 60/326,425, filed Oct. 3, 2001, entitled "MiniMAC TDMA Protocol," the disclosure of both of which are incorporated by reference in its entirety. This application also relies for priority on U.S. provisional application Ser. No. 60/416,520, by William M. Shvodian, filed Oct. 8, 2002, entitled "METHOD FOR CONTROLLING A DATA STREAM," the contents of which are hereby incorporated by reference in their entirety.

BACKGROUND OF THE INVENTION

The present invention relates to wireless personal area networks and wireless local area networks. More particularly, the present invention relates to systems, methods, devices, and computer program products for controlling the transmission of data in a wireless personal area network or wireless local area network environment.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY Layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802.15 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of devices 321–325. The coordinator 310 serves to control the operation of the network 300. As noted above, the system of coordinator 310 and devices 321–325 may be called a piconet, in which case the coordinator 310 may be referred to as a piconet coordinator (PNC). Each of the non-coordinator devices 321–325 must be connected to the coordinator 310 via primary wireless links 330, and may also be connected to one or more other non-coordinator devices 321–325 via secondary wireless links 340, also called peer-to-peer links.

In addition, although FIG. 3 shows bi-directional links between devices, the could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 321–325, except with the additional functionality for coordinating the system, and the requirement that it communicate with every device 321–325 in the network 300. In other embodiments the coordinator 310 may be a separate designated control unit that does not function as one of the devices 321–325.

Through the course of the following disclosure the coordinator 310 will be considered to be a device just like the non-coordinator devices 321–325. However, alternate embodiments could use a dedicated coordinator 310. Furthermore, individual non-coordinator devices 321–325 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 321–325 are confined to a usable physical area 350, which is set based on the extent to which the coordinator 310 can successfully communicate with each of the non-coordinator devices 321–325. Any non-coordinator device 321–325 that is able to communicate with the coordinator 310 (and vice versa) is within the usable area 350 of the network 300. As noted, however, it is not necessary for every non-coordinator device 321–325 in the network 300 to communicate with every other non-coordinator device 321–325.

FIG. 4 is a block diagram of a device 310, 321–325 from the network 300 of FIG. 3. As shown in FIG. 4, each device (i.e., each coordinator 310 or non-coordinator device 321–325) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 310, 321–325. These upper layers 430 may include TCP/IP, TCP, UDP, RTP, IP, LLC, or the like.

Typically, the coordinator 310 and the non-coordinator devices 321–325 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using time division multiple access (TDMA). Using this standard, the MAC layer 420 defines frames and superframes through which the sharing of the bandwidth by the devices 310, 321–325 is managed by the coordinator 310 and/or the non-coordinator devices 321–325.

Of particular interest is how individual devices 321–325 can join an existing network 300, and how they will communicate with the coordinator 310 during operation of the network 300. This is preferably done to avoid collisions between different devices, which may occur if two or more devices 321–325 try and communicate (with each other or the coordinator 310) at the same time.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

SUMMARY OF THE INVENTION

Consistent with the title of this section, only a brief description of selected features of the present invention is now presented. A more complete description of the present invention is the subject of this entire document.

An object of the present invention is to provide a method for increasing the data throughput speed for a wireless network.

Another object of the present invention is to reduce the amount of dead time in a data transmission scheme by allowing transmitting devices a greater choice of devices that they can send signals to.

Some of these objects are accomplished by way of a method of transmitting data packets from a source device in a wireless network. This method comprises receiving a channel time allocation assignment at the source device, the channel time allocation assignment indicating: an assigned channel time allocation, a source address indicating that the source device is assigned to transmit during the assigned channel time allocation, and a destination address indicating that a destination device is assigned to listen during the assigned channel time allocation; performing a first determining step to determine whether the source device has primary data to send to the destination device; sending primary data from the source device to the destination device during the assigned channel time allocation if the first determining step determines that the source device does have primary data to send; performing a second determining step to determine whether any time remains in the assigned channel time allocation after the step of sending primary data; performing a third determining step to determine whether the source device has secondary data to send to a secondary device not assigned as the destination device if the second determining step determines that time remains in the assigned channel time allocation; performing a fourth determining step to determine whether the secondary device is listening during the assigned channel time allocation if the third determining step determines that the source device has secondary data to send to the secondary device; and sending secondary data from the source device to the secondary device during the assigned channel time allocation if the fourth determining step determines that the source device does have secondary data to send.

The method may further comprise: performing a fifth determining step to determine whether any time remains in the assigned channel time allocation after the step of sending secondary data; and repeating the second, third, and fourth determining steps as well as the step of sending secondary data if the fifth determining step determines that time remains in the assigned channel time allocation.

In this method, the source device may maintain a device listening mode list of all network devices, the device listening mode list indicating a listening mode that each network device is currently operating in. In this case, the third determining step may be performed by having the source device look up the secondary device in the device listening mode list.

The listening modes include: a listen-to-all mode indicating a policy of listening to all possible channel time allocations regardless of their assigned destination address; a listen-to-multicast mode indicating a policy of listening to all possible channel time allocations that are assigned to a multicast address as the destination address; and a listen-to-source mode indicating a policy of listening to all possible channel time allocations that are assigned to a set unicast address as the destination address.

Another method is also provided of transmitting data packets from a source device in a wireless network. This method comprises: receiving a channel time allocation assignment at the source device, the channel time allocation assignment indicating: an assigned channel time allocation, a source address indicating that the source device is assigned to transmit during the assigned channel time allocation, and a destination address indicating that a destination device is assigned to listen during the assigned channel time allocation; performing a first determining step to determine whether the source device has secondary data to send to a secondary device not assigned as the destination device; performing a second determining step to determine whether the secondary device is listening during the assigned channel time allocation if the first determining step determines that the first device has secondary data to send to the secondary device; and sending secondary data from the source device to the secondary device during the assigned channel time allocation if the second determining step determines that the source device does have secondary data to send.

The method may further comprise: performing a third determining step to determine whether any time remains in the assigned channel time allocation after the step of sending secondary data; and repeating the first, second, and third determining steps as well as the step of sending secondary data if the third determining step determines that time remains in the assigned channel time allocation.

In this method, the source device may maintain a device listening mode list of all network devices, the device listening mode list indicating a listening mode that each network device is currently operating in. In this case, the third determining step may be performed by having the source device look up the secondary device in the device listening mode list.

The listening modes include: a listen-to-all mode indicating a policy of listening to all possible channel time allocations regardless of their assigned destination address; a listen-to-multicast mode indicating a policy of listening to all possible channel time allocations that are assigned to a multicast address as the destination address; and a listen-to-source mode indicating a policy of listening to all possible channel time allocations that are assigned to a set unicast address as the destination address.

Still another method is provided of transmitting data packets from a source device in a wireless network. This method comprises: receiving a channel time allocation assignment at the source device, the channel time allocation assignment indicating: an assigned channel time allocation, a source address indicating that the source device is assigned to transmit during the assigned channel time allocation, and a destination address indicating that a destination device is assigned to listen during the assigned channel time allocation; performing a first determining step to determine whether the source device has primary data to send to the destination device; sending primary data from the source device to the destination device during the assigned channel time allocation if the first determining step determines that the source device does have primary data to send; performing a second determining step to determine whether any time remains in the assigned channel time allocation after the step of sending primary data; performing a third determining step to determine which non-destination devices are listening during the assigned channel time allocation if the second determining step determines that time remains in the assigned channel time allocation; performing a fourth determining step to determine whether the source device has secondary data to send to a secondary device if the third determining step determines that at least one of the non-destination devices will be listening during the assigned channel time allocation, the secondary device being one of the non-destination devices that will be listening during the assigned channel time allocation; and sending secondary data from the source device to the secondary device during the assigned channel time allocation if the fourth determining step determines that the source device does have secondary data to send.

The method may further comprise: performing a fifth determining step to determine whether any time remains in the assigned channel time allocation after the step of sending secondary data; and repeating the second, third, and fourth determining steps as well as the step of sending secondary data if the fifth determining step determines that time remains in the assigned channel time allocation.

In this method, the source device may maintain a device listening mode list of all network devices, the device listening mode list indicating a listening mode that each network device is currently operating in. In this case, the third determining step may be performed by having the source device look up the secondary device in the device listening mode list.

The listening modes include: a listen-to-all mode indicating a policy of listening to all possible channel time allocations regardless of their assigned destination address; a listen-to-multicast mode indicating a policy of listening to all possible channel time allocations that are assigned to a multicast address as the destination address; and a listen-to-source mode indicating a policy of listening to all possible channel time allocations that are assigned to a set unicast address as the destination address.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

DETAILED DESCRIPTION OF THE PREFERRED EMBODIMENTS

Figure 1:
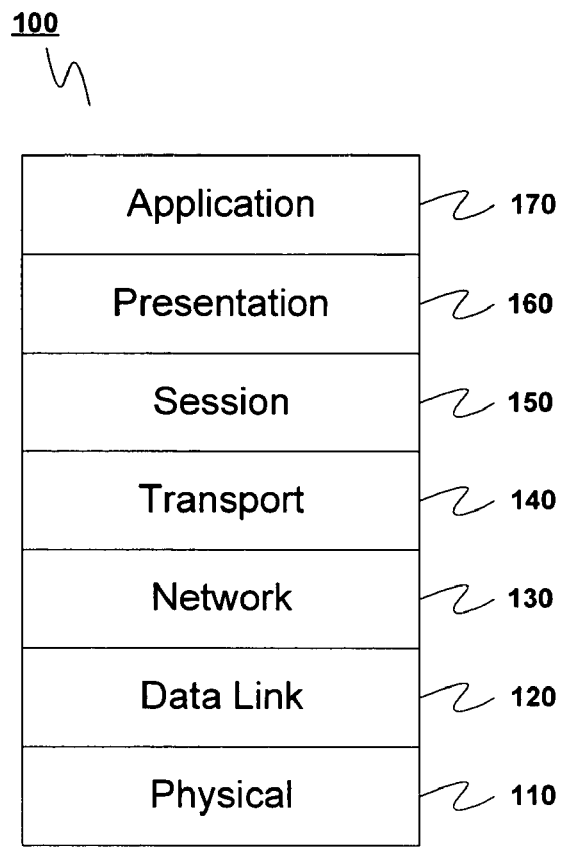
FIG. 1 is a block diagram of the OSI standard for a computer communication architecture.
Figure 2:
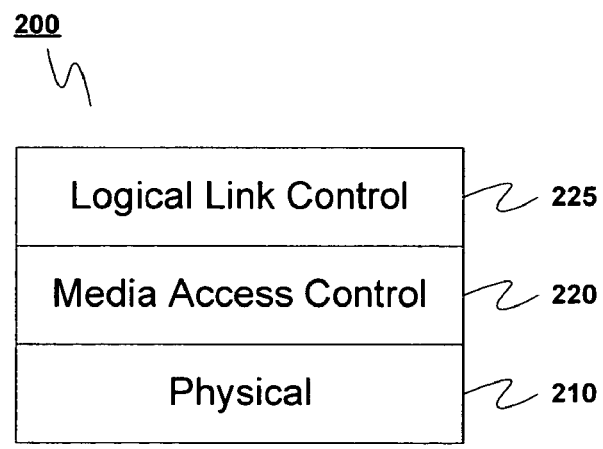
FIG. 2 is a block diagram of the IEEE 802 standard for a computer communication architecture.
Figure 3:
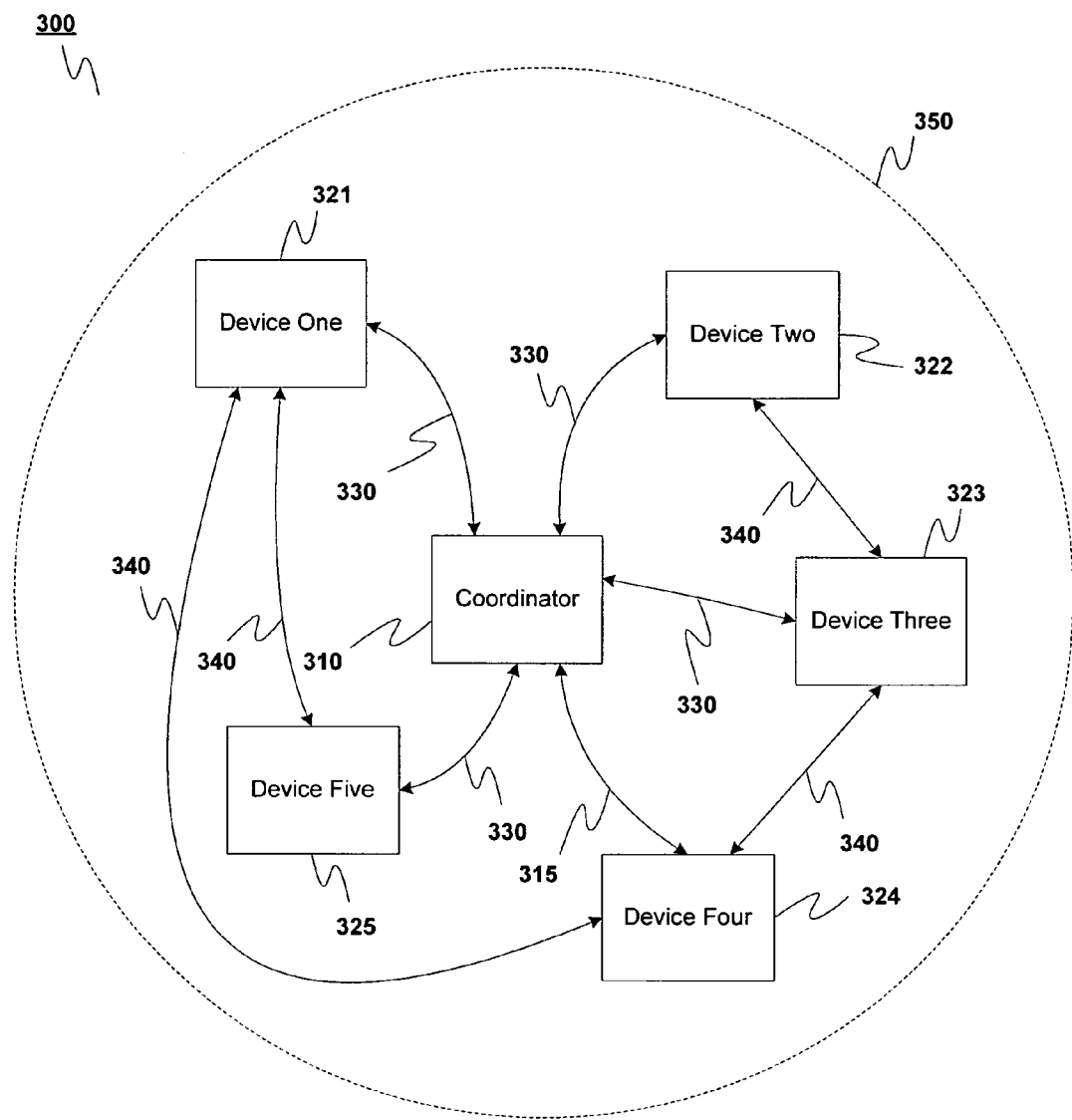
FIG. 3 is a block diagram of a wireless network.
Figure 4:
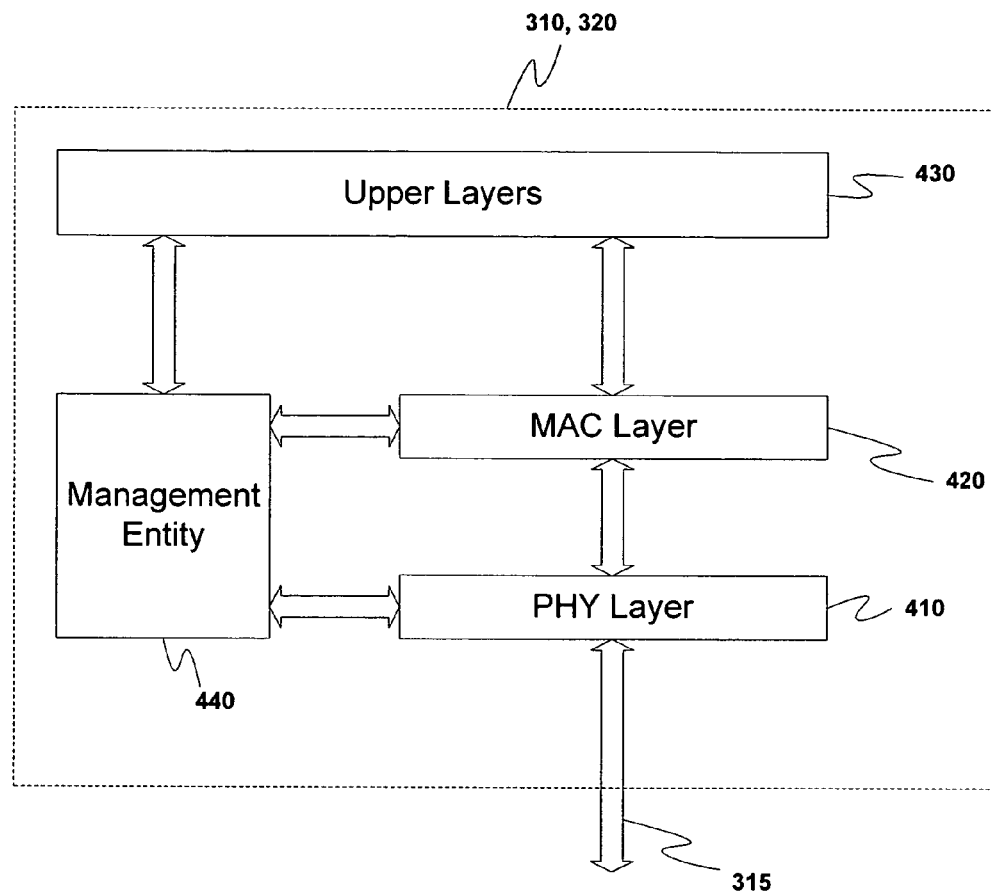
FIG. 4 is a block diagram of a device or coordinator in the wireless network of FIG. 3.

The present invention provides a method of coordinating devices 310, 321–325 either operating in a network 300 or trying to join a network 300 through the use of cyclic beacons inside superframes that define the data path across the network 300.

Device IDs and MAC Addresses

One important aspect of coordinating devices 310, 321–325 in a network 300 is uniquely identifying each of the devices 310, 321–325. There are several ways in which this can be accomplished.

Independent of any network it is in, each device 310, 321–325 has a unique MAC address that can be used to identify it,. This MAC address is generally assigned by the manufacturer so that no two devices 310, 321–325 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 321–325 in the network 300 to use in addition its unique MAC address. In the preferred embodiments the MAC 420 uses ad hoc device IDs to identify devices 310, 321–325. These device IDs can be used, for example, in the MAC header. The device IDs are generally much smaller than the MAC addresses for each device 310, 321–325. In the preferred embodiments the device IDs are 4-bits and the MAC addresses are 48-bits.

Each device 310, 321–325 should maintain mapping table that maps the correspondence between device IDs and MAC addresses. The table is filled in based on the device ID and MAC address information provided to the devices 321–325 by the coordinator 310. This allows each device 310, 321–325 to reference themselves and the other devices in the network 300 by either device ID or MAC address.

When identifying devices 310, 321–325, the network can use a unicast address to identify a single device 310, 321–325, a multicast address to identify multiple devices 310, 321–325, and a broadcast address to identify all of the devices 310, 321–325.

Unicast Addresses

The network 300 uses unicast addresses to identify a single device 310, 321–325. In preferred embodiments the device IDs are used as unicast addresses. Since each device 310, 321–325 will have a unique device ID, they will also each have a unique unicast address. Unicast addresses can be used to identify both the source and destination for a frame or data stream.

Multicast Addresses

The network 300 uses a multicast address to refer to a plurality of devices 310, 321–325. This is preferably a single address that is the same length and format as the device IDs, but is unassigned to any single device 310, 321–325. The multicast address will only used when referring to the destination for a frame or data stream since only a single device 310, 321–325 can operate as a transmitter at given time.

When the multicast address is used, it will preferably also have an associated set of stream information that indicates which specific subset of devices 310, 321–325 is encompassed by the current multicast.

Alternate embodiments could employ multiple multicast addresses, however. In this case, each multicast address could be directed to a specific multicast group of devices 310, 321–325, and may also have an associated set of stream information that indicates which specific subset of devices 310, 321–325 is encompassed by the multicast address.

Broadcast Address

The network 300 uses a broadcast address to refer to all of the devices 310, 321–325 in the network. This is preferably a single address that is the same length and format as the device IDs, but is unassigned to either any single device 310, 321–325 or as a multicast address. The broadcast address will only used when referring to the destination for a frame or data stream since only a single device 310, 321–325 can operate as a transmitter at given time.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

Figure 5:
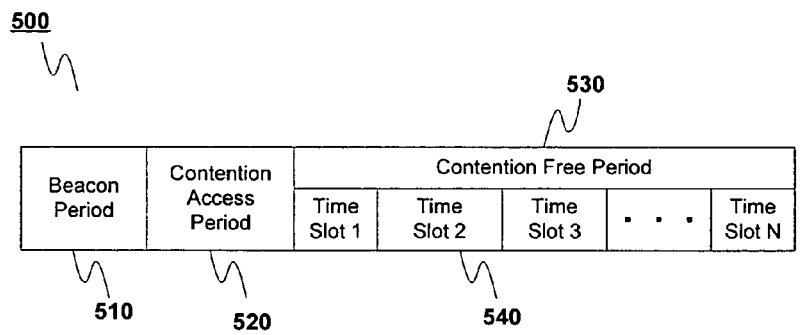
FIG. 5 is a block diagram of a superframe according to preferred embodiments of the present invention.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame (see, e.g., FIGS. 6 and 8H) out to the non-coordinator devices 321–325 in the network 300. Each device 321–325 knows how to recognize a beacon 510 prior to joining the network 300, and uses the beacon 510 both to identify an existing network 300 and to coordinate communication within the network 300.

The CAP 520 may be used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to pairs of devices 310, 321–325 for transmission of information between them (i.e., each time slot 540 is assigned to a specific transmitter-receiver pair—also called a source-destination pair). And although the term "pair" is used, this may actually encompass more than one device 310, 321–325, since the receiver/destination may be all the devices in the network 300 (i.e., a broadcast destination) or a group of devices in the network 300 (i.e., a multicast destination).

The time slots 540 may be management time slots (MTSs) or guaranteed time slots (GTSs). An MTS is a time slot that is used for transmitting administrative information between the coordinator 310 and one of the non-coordinator devices 321–325. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device. In some embodiments, short frames of asynchronous data may be sent during management time slots.

Another term for time slots is channel time allocations (CTAs). This can be used interchangeably with the term "time slots." Thus, GTSs can be called guaranteed channel time allocations (GCTAs) and MTSs can be called management channel time allocations (MCTAs).

A GTS is a time slot that is used for transmitting non-administrative data between devices 310, 321–325 in the network 300. This can include data transmitted between two non-coordinator devices 321–325, or non-administrative data transmitted between the coordinator 310 and a non-coordinator device 321–325.

As used in this application, a stream is a communication between a source device and one or more destination devices. The source and destination devices can be any devices 310, 321–325 in the network 300. For streams to multiple destinations, the destination devices can be all or some of the devices 310, 321–325 in the network 300. In other words, the source address must be a unicast address (i.e., a single device ID), but the destination address can be a unicast address, the multicast address, or the broadcast address.

In some embodiments the uplink MTS may be positioned at the front of the CFP 530 and the downlink MTSs positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 321–325 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 321–325 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a device 321–325 successfully receives a beacon frame from the coordinator 310.

For simplicity, a single guard time value may be used for the entire superframe. The guard time will preferably be placed at the end of each beacon frame, GTS, and MTS.

Frames

Within each superframe 500, information is passed between devices 310, 321–325 through frames, which define how signals will be sent. In particular, a frame defines how the bits that make up the signal are organized so that they will be sent in a recognizable format.

Figure 6:
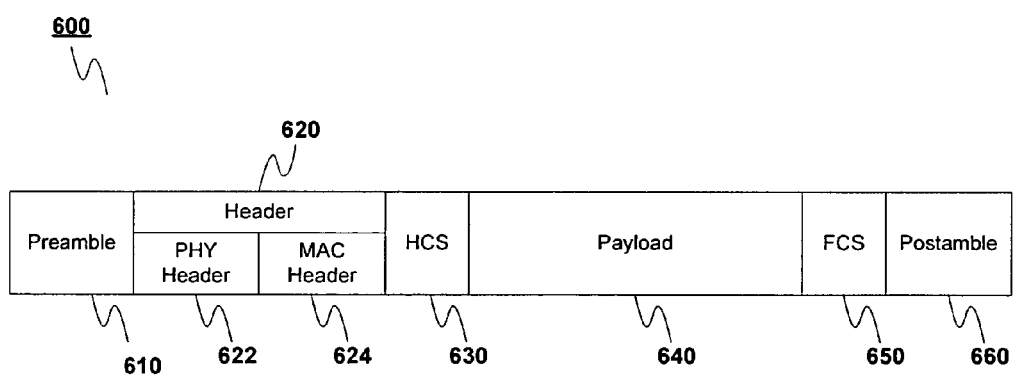
FIG. 6 is a block diagram of a frame according to a preferred embodiment of the present invention.

FIG. 6 is a block diagram of a frame according to preferred embodiments of the present invention. As shown in FIG. 6, the frame 600 may include a preamble 610, a header 620, a header check sequence (HCS) 630, a payload 640, a frame check sequence (FCS) 450, and a postamble 660. The header 620 is preferably divided into a physical header 622 and a MAC header 624. These elements will be discussed in more detail below.

Headers

As noted above, the header 620 is divided into a physical header 622 and a MAC header 624. The physical header 622 provides information about the physical signal sent between devices 310, 321–325, and it preferably includes at least the length of the current payload 640. It may also include information relating to the data rate at which the payload 640 is sent, or other information.

Figure 7A:
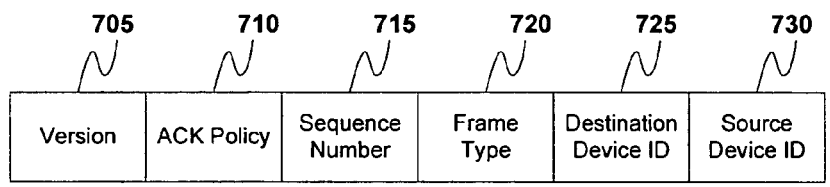
FIGS. 7A and 7B are block diagrams showing the MAC header of FIG. 6 according to preferred embodiments of the present invention.
Figure 7B:
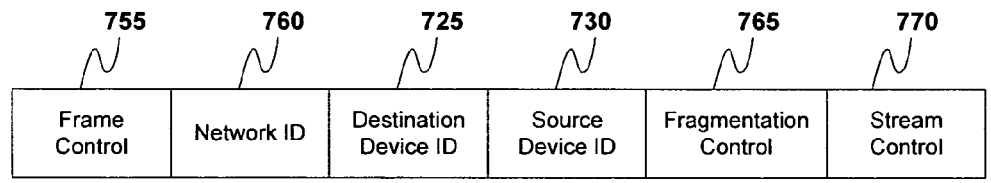

The MAC header 624 preferably includes data relating to the transfer of frames between devices 310, 321–325. FIGS. 7A and 7B are block diagrams showing the MAC header of FIG. 6 according to preferred embodiments of the present invention. FIG. 7A is a block diagram showing the MAC header according to a first preferred embodiment, and FIG. 7B is a block diagram showing the MAC header according to a second preferred embodiment.

As shown in FIG. 7A, the MAC header 624 may include a version indicator 705, an ACK policy indicator 710, a sequence number 715, a frame type 720, a destination device ID 725, and a source device ID 730.

A beacon frame type indicates that the frame is a beacon 510, which is generated by the coordinator 310 at start of every superframe 500. A status request frame is sent by the coordinator 310 in an MTS to check on the status of the destination device. An association request frame is sent by a new device requesting that the coordinator 310 let it join the network 310. An association reply frame is sent by the coordinator 310 to a new device in response to an association request frame. A disassociation indication frame is sent by a current device 321–325 to the coordinator 310 to indicate disassociation from the network 300. An ACK frame indicates an immediate acknowledgement (ACK) of a previous frame. A data frame is sent between any two devices to pass isochronous data along a stream. A stream allocation request frame is sent by a current device 321–325 to the coordinator 310 to request that it be allocated a stream. A stream allocation reply frame is sent from the coordinator 310 to a current device 321–325 in response to a stream request frame. A stream de-allocation frame is sent from a current device 321–325 to the coordinator 310 to indicate that the current device 321–325 no longer needs a stream. A stream reallocation frame is sent from a device 321–325 to a coordinator 310 to request a change of an already-allocated stream.

The destination device ID 725 is the ID of the device or devices 310, 321–325 to which the frame 600 is being sent. If the frame 600 is being sent to a single device 310, 321–325 then the destination device ID is simply the device ID of the destination device 310, 321–325 (i.e., its unicast address). If the frame 600 is being sent to all of the devices 310, 321–325 in the network 300, then the destination device ID is a broadcast ID (i.e., the broadcast address). If the frame 600 is being sent to some subset of devices 310, 321–325 then the destination device ID is a multicast ID (i.e., the multicast address).

The source device ID 730 is the device ID (i.e., the unicast address) of the device 310, 321–325 from which the frame 600 is being sent.

FIG. 7B shows a MAC header 624 according to a second preferred embodiment of the present invention. This embodiment conforms with the header format in the IEEE 802.15.3 standard. As shown in FIG. 7B, the MAC header 624 may include a frame control 755, a network ID 760, a destination device ID 725, a source device ID 730, a fragmentation control 765, and a stream control 770.

The destination device ID 725 is the ID of the device or devices 310, 321–325 to which the frame 600 is being sent. If the frame 600 is being sent to a single device 310, 321–325 then the destination device ID is simply the device ID of the destination device 310, 321–325 (i.e., its unicast address). If the frame 600 is being sent to all of the devices 310, 321–325 in the network 300, then the destination device ID is a broadcast ID (i.e., the broadcast address). If the frame 600 is being sent to some subset of devices 310, 321–325 then the destination device ID is a multicast ID (i.e., the multicast address).

The source device ID 730 is the device ID (i.e., the unicast address) of the device 310, 321–325 from which the frame 600 is being sent.

The stream control 770 indicates a unique stream identifier for the stream used by the current frame 600.

Payload

Figure 8A:
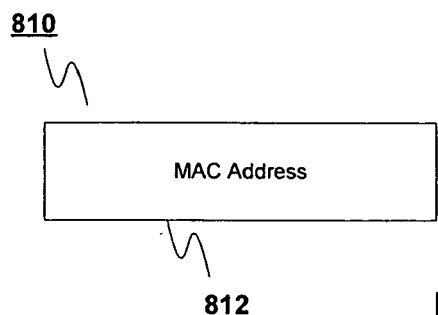
FIGS. 8A through 8G are block diagrams showing exemplary payloads from FIG. 6 according to a first preferred embodiment of the present invention.
Figure 8B:
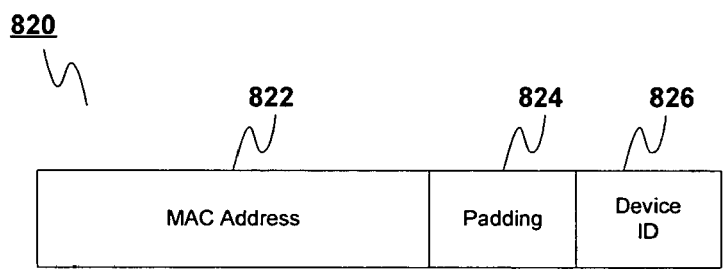
Figure 8C:
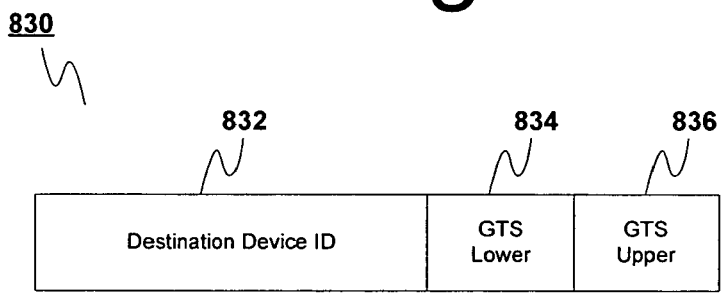
Figure 8D:
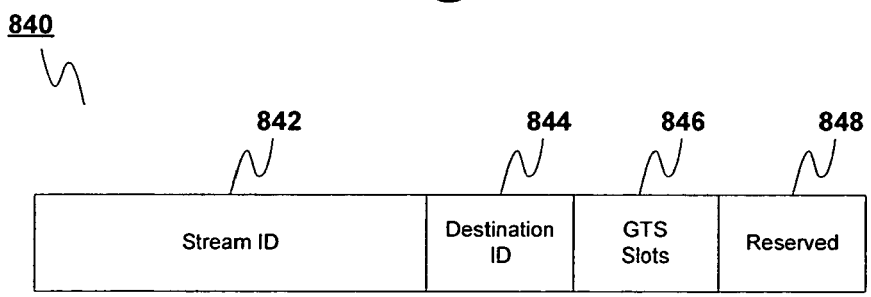
Figure 8E:
Figure 8E:
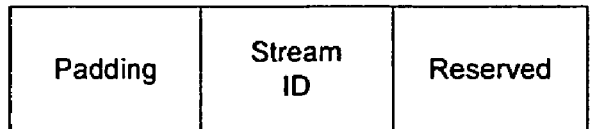
Figure 8F:
Figure 8F:
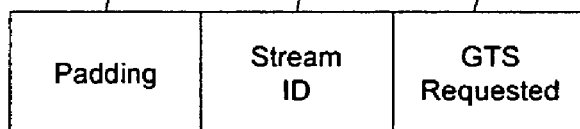
Figure 8G:
Figure 8G:
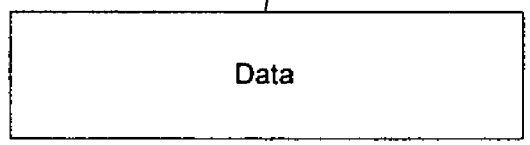

The payload 640 contains the data (if any) required by the current frame 600. FIGS. 8A through 8H are block diagrams showing exemplary payloads 640 from FIG. 6 according to a first preferred embodiment of the present invention. In particular, FIG. 8A is an association request payload; FIG. 8B is an association reply payload; FIG. 8C is a stream request payload; FIG. 8D is a stream reply payload; FIG. 8E is a stream free payload; FIG. 8F is a stream reallocation payload; FIG. 8G is a data payload; and FIG. 8H is a beacon payload.

FIG. 8A is a block diagram of shows an association request payload according to a preferred embodiment. This is used when a MAC 420 in a new device requests to become a member of the network 300. As shown in FIG. 8A, the association request payload 810 may include the MAC address of the requestor 812.

FIG. 8B is a block diagram of an association reply payload according to a preferred embodiment. This is used when the coordinator 310 responds to an association request frame 820. As shown in FIG. 8B, the association reply payload 820 may include a MAC address 822, a padding block 824, and a device ID 826.

FIG. 8C is a block diagram of a stream request payload according to the first preferred embodiment. This is used when a device 321–325 requests a stream to communicate with another device. As shown in FIG. 8C, the stream request payload 830 may include a destination device ID 832, a GTS lower value 834, a GTS upper value 836, and a reserved block 838.

The destination device ID 832 is the device ID of the receiver of the packets in the current data stream. The destination address 832 may be any unicast address or the broadcast address, or a multicast address.

The GTS lower value 834 is the minimum acceptable amount of GTSs that can be allocated to the data to be sent. The GTS upper value 836 is the maximum requested GTSs for the data transfer. In this embodiment the GTS lower value 834 and the GTS upper value 836 are preferably indicative of the number of time units (e.g. in microseconds) for the request. In addition, the GTS lower value 834 should be less than or equal to the GTS upper value 836.

The reserved block 838 represents bits in the payload 640 that are not used in this embodiment. In alternate embodiments other parameters may be altered to reduce or eliminate the reserved block 838.

FIG. 8D is a block diagram of a stream reply payload according to the first preferred embodiment. This is used when the coordinator 310 responds to a stream request payload 830 from a device 321–325. As shown in FIG. 8D, the stream reply payload 840 may include a stream ID 842, a destination ID 844, a GTS slot value 846, and a reserved block 848.

The stream-ID 842 is the unique identifier given to the stream assigned to the requesting device 321–325. This value is set at a specified Stream Failure value if the allocation failed (e.g., coded as 0×F in the first preferred embodiment).

The destination ID 844 is the device ID of the designated receiver device. This can be a unicast address, a broadcast address, or a multicast address.

Upon a successful allocation, the GTS slot value 846 indicates the number of assigned time units.

The reserved block 838 represents bits in the payload 640 that are not used in this embodiment. In alternate embodiments other parameters may be altered to reduce or eliminate the reserved block 838.

FIG. 8E is a block diagram of a stream free payload according to the first preferred embodiment. This us used by a device, 321–325 to inform the coordinator 310 that it no longer intends to use a stream and that the corresponding GTS may be reused. As shown in FIG. 8E, the stream free payload 850 may include a padding block 852, a stream ID 854, and a reserved block 856.

The padding block 852 is a set of bits that are unused but allocated to the stream free payload 850. This is because the frames are preferably aligned to octets and the padding block 852 is needed to provide correct alignment. In alternate embodiments where no octet alignment is used or where there is no need to pad to maintain octet alignment, the padding block could be eliminated. Preferably the value stored in the padding block 852 is zero, i.e., it is a string of zeros.

The stream ID 854 is the same stream ID 842 as was returned in an associated stream reply payload 840. It provides a unique identifier for the assigned stream.

The reserved block 856 represents bits in the payload 640 that are not used in this embodiment. In alternate embodiments other parameters may be altered to reduce or eliminate the reserved block 856.

FIG. 8F is a block diagram of a stream reallocation payload according to the first preferred embodiment. This is used by a device to request an increased or decreased amount of GTSs for a stream. In alternate embodiments this may also be used to request changes in other parameters. As shown in FIG. 8F, the stream reallocation payload 860 may include a padding block 862, a stream ID 864, and a GTS requested value 866.

The padding block 862 is a set of bits that are unused but allocated to the stream reallocation payload 860. This is because the frames are preferably aligned to octets and the padding block 862 is needed to provide correct alignment. In alternate embodiments where no octet alignment is used or where there is no need to pad to maintain octet alignment, the padding block could be eliminated. Preferably the value stored in the padding block 862 is zero, i.e., it is a string of zeros.

The stream ID 864 is the same stream ID 842 as was returned in an associated stream reply payload 840. It provides a unique identifier for the assigned stream.

The GTS requested value 866 is the new desired amount of GTSs that the requestor wants. The coordinator 310 may deny the request and leave the GTS assignment unchanged, or it may allow the request and raise or lower the GTS assignment accordingly, or it may partially allow the request, raising or lowering the GTS assignment less than the amount requested.

FIG. 8G is a block diagram of a data payload according to the first preferred embodiment. This is used when data must be sent between two devices 310, 321–325. As shown in FIG. 8G, the data payload 870 may include a data block 872. This data block 872 is simply a string of data bits of a length set forth in the physical header 622.

Postamble

The frame 600 may also include a postamble 660, which is a bit sequence set at the end of each frame 600 to assist in synchronization or perform other administrative functions such as flush on tail bits or symbols. A postamble 660 can be eliminated in some embodiments. In fact, the preferred embodiment described with respect to FIG. 7A below does not use a postamble 660.

It should be understood that the frames described above are by way of example, and are not intended to be restrictive. Other frames with other frame formats can also be used. In particular, the present invention is usable with the frame formats used in the IEEE 802.15.3 standard.

SUPERFRAME EMBODIMENTS

Figure 9:
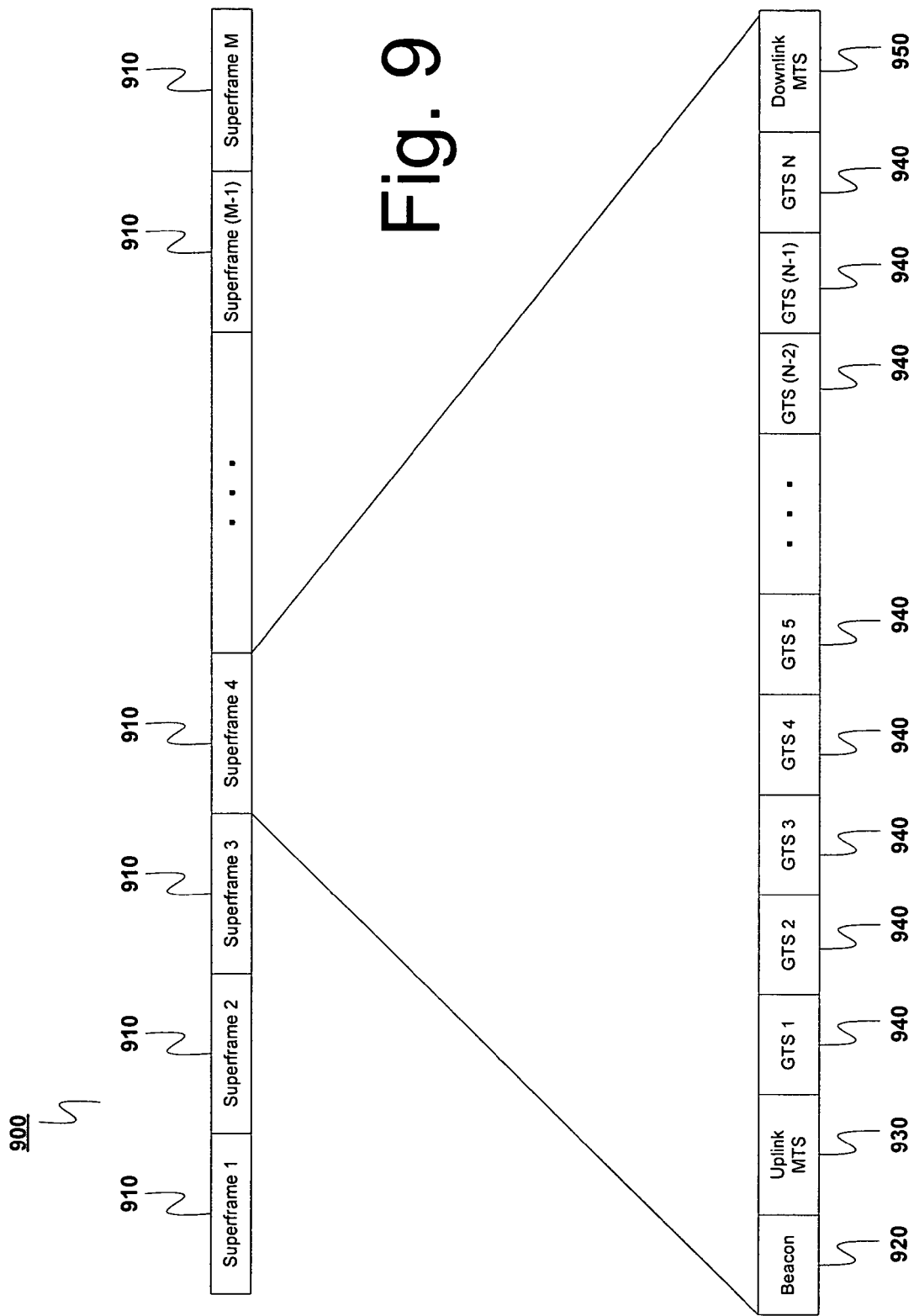
FIG. 9 is a block diagram showing an arrangement of elements in a superframe in accordance with the first preferred embodiment of the invention.
Figure 10:
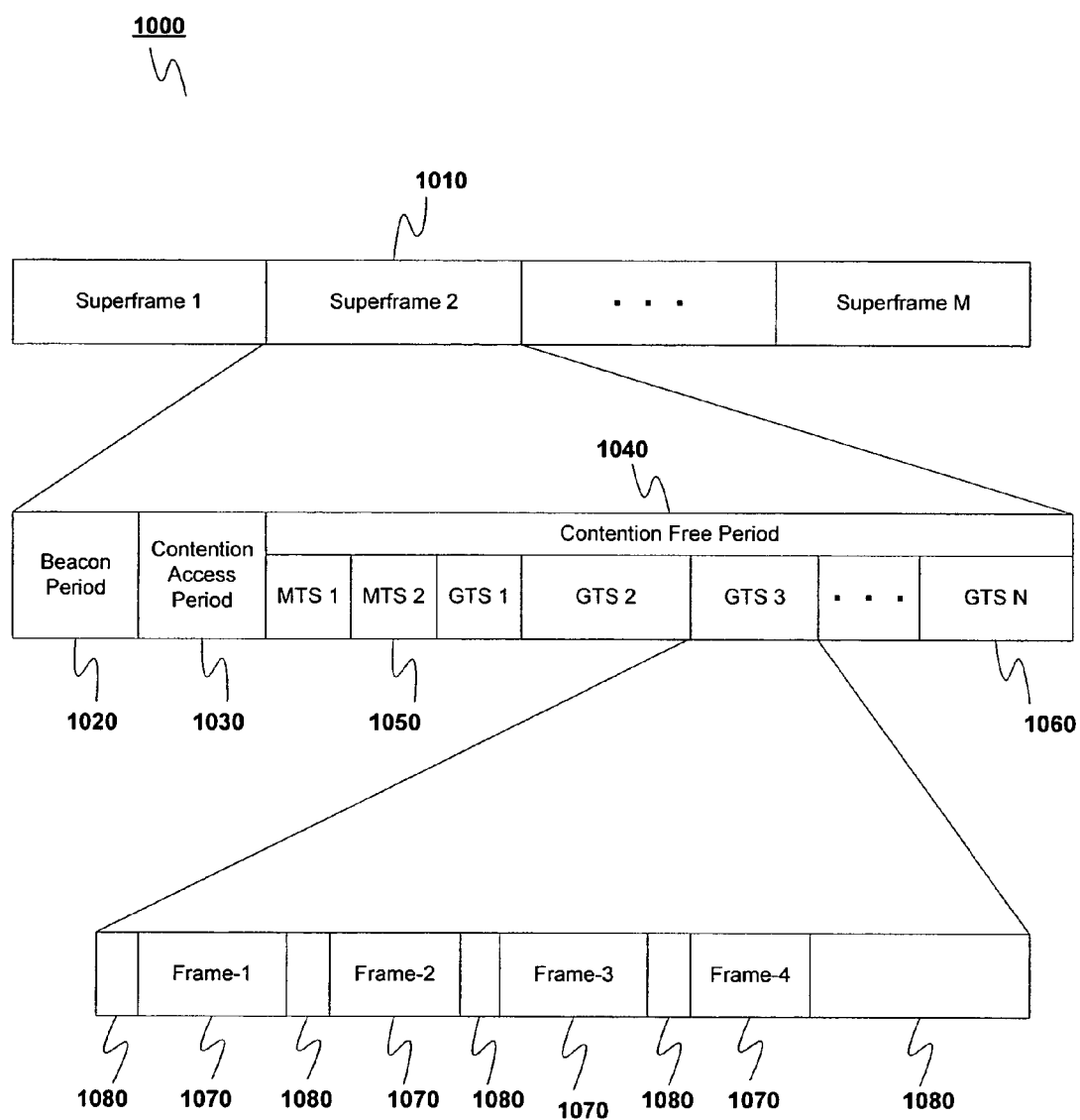
FIG. 10 is a block diagram showing an arrangement of elements in a superframe in accordance with the second preferred embodiment of the invention.

The exact design of a superframe 500 can vary according to implementation. FIGS. 9 and 10 show two preferred embodiments of a specific superframe design. FIG. 9 is a block diagram showing an arrangement of elements in a superframe in accordance with the first preferred embodiment of the invention. FIG. 10 is a block diagram showing an arrangement of elements in a superframe in accordance with the second preferred embodiment of the invention.

FIRST PREFERRED EMBODIMENT

As shown in FIG. 9, the transmission scheme 900 involves dividing the available transmission time into a plurality of superframes 910. This embodiment uses the MAC header 622 disclosed in FIG. 7A and the payloads 640 disclosed in FIGS. 8A through 8H.

In this embodiment each individual superframe 910 includes a beacon frame 920, an uplink MTS 930, a plurality of GTSs 940, and a downlink MTS 950.

The beacon frame 920 is a frame 600 whose payload 640 is a beacon payload 880, as shown in FIG. 8H. It indicates by association ID (known as a device ID in the IEEE 802.15.3 draft standard) a device 321–325 that is assigned to the current superframe 910. It also indicates via the RxTx table 888 [FIX THIS?] the transmitter/receiver pairs that are assigned to the individual GTSs 940.

In an alternate embodiment, a stream index may be added to allow multiple streaming between the same source-destination pair. This can be shown, for example, in the CTA for the draft 802.15.3 standard, which allows for such multiple streaming.

The uplink MTS 930 is set aside for the device 321–325 assigned (e.g., by device ID in an MTS information element) to the current superframe 910 to upload signals to the coordinator 310. All other devices 321–325 remain silent on the current channel during this time slot. In alternate embodiments that use multiple channels, all other stations on that channel must remain silent during an uplink MTS 930, though they may still transmit on alternate channels.

The plurality of GTSs 940 are the time slots set aside for each of the devices 310, 321–325 to communicate with each other. They do so in accordance with the information set forth in the CTA IES 888 [CHECK THIS WITH BILL] in the beacon 920. Each GTS 940 is preferably large enough to transmit one or more data frames. When a device pair is assigned multiple GTSs 940, they are preferably contiguous.

The downlink MTS 950 is set aside for the coordinator 310 to download signals to the device 321–325 assigned to the current superframe 910. All other devices 321–325 may ignore all transmissions during this time slot.

The length of the superframe 910 is fixed, and is preferably chosen to have a duration between 10 and 30 ms in order to minimize the data buffering requirements.

The lengths of the uplink and downlink MTSs 930 and 950 must be chosen to handle the largest possible management frame, an immediate ACK frame, and the receiver-transmitter turnaround time. For the GTSs 940, the length and number is flexible.

SECOND PREFERRED EMBODIMENT

As shown in FIG. 10, the transmission scheme 1000 involves dividing the available transmission time into a plurality of superframes 1010. This embodiment uses the MAC header 624 disclosed in FIG. 7B. The payloads 640 used are preferably those used in the IEEE 802.15.3 standard.

In this embodiment the data transmission scheme 1000 includes transmitting successive superframes 1010 in time across the network 300. Each superframe 1010 includes a beacon 1020, an optional contention access period (CAP) 1030, and a contention free period (CFP) 1040. The contention free period 1040 may include one or more management time slots (MTSs) 1050 and one or more guaranteed time slots (GTSs) 1060.

Management time slots 1050 can be downlink management time slots (DMTSs) in which information is sent from the coordinator 310 to a non-coordinator device 321–325, or uplink management time slots (UMTSs) in which information is sent from a non-coordinator device 321–325 to the coordinator 310.

In this preferred embodiment two management time slots 1050 are used per superframe 1010, one uplink and one downlink, though alternate embodiments could choose different numbers of management time slots 1050 and mixtures of uplink and downlink. MTSs can also be shared among multiple devices 321–325. In this case a convention resolution method, such as slotted Aloha, must be used. In addition, if a CAP 1030 is used to pass administrative information, the use of MTSs 1050 may be reduced or eliminated.

In the second preferred embodiment there are as many guaranteed time slots 1060 as there are active primary and secondary wireless links 330 and 340. However, this may change in alternate embodiments. In any given superframe 500 there may be greater or fewer guaranteed time slots 1060 than there are active primary and secondary wireless links 330 and 340. In this case the coordinator 310 will designate how the devices 310, 321–325 should use the available guaranteed time slots 1060.

The guaranteed time slots 1060 in this embodiment are preferably dynamic in size. Each transmitter-receiver pair that is allocated a GTS 1060 is also told the duration of the GTS 1060 that the pair is assigned to the beacon. These durations may be of different sizes for different GTSs within a single superframe 1010. Furthermore, the length and position of a given GTS 1060 may change across different superframes 1010, limited only by the ability of the coordinator 310 to successfully inform the non-coordinator devices 321–325 of the change. The starting times and durations of the guaranteed time slots 1060 are determined by the coordinator 310 and sent to the devices 321–325 during the contention access period 1030 or one of the management time slots 1050, as implemented.

In the second preferred embodiment the coordinator 310 uses the beacon 1020 (in whatever format it is) and the MTSs to coordinate the scheduling of the individual devices 310, 321–325 into their respective guaranteed time slots 1060. All devices 310, 321–325 listen to the coordinator 310 during the beacon period 1020. Each device 321–325 will receive zero or more time slots 1050, 1060, being notified of each start time and duration from the coordinator 310 during the beacon period 1020. The coordinator 310 automatically allocates management time slots 1050 to each device 321–325. However, guaranteed time slots 1060 are only assigned when the device 321–325 requests them.

Channel time allocation (CTA) fields in the beacon 1020 include start times, packet duration, source device ID, destination device ID, and a stream index. This beacon information uses what is often called TLV format, which stands for type, length, and value. As a result, each device knows when to transmit and when to receive. In all other times devices 310, 321–325 may cease listening and go into a power conservation mode. The beacon period 1020, therefore, is used to coordinate the transmitting and receiving of the devices 310, 321–325.

The coordinator 310 sends the beacon 1020 to all of the non-coordinator devices 321–325 at the beginning of each superframe 1010. the beacon 1020 tells each non-coordinator device 321–325 the duration or superframe 1010 as well as other information about its MAC address. Each beacon 1020 will also contain information that is not precisely a CTA. One piece of information will define the beacon period 1020 and describe the start time and the duration for the beacon period 1020. Another will define the contention access period 1030 (if any) and describe the start time and the duration for the contention access period 1030. Each beacon can also have multiple CTAs. There will be a CTA for each of the time slot 1050,1060 (whether MTS or GTS). Using dynamic time slots, the slot assignments can change the CTAs every superframe.

During transmission, each device 310, 321–325 must hear the beacon 1020 so that it will know what time slots 1050, 1060 have been assigned to it as either a transmitter or receiver. If the device misses the beacon 1020, it may listen to the entire superframe 1010 just in case it is receiving data. Furthermore, in some implementations it may not be allowed to transmit for the duration of the superframe 1010 because it does not know when it is permitted to transmit. This is detrimental to the system because it may lead to interruptions in data transmission.

The network can pass control and administrative information between the coordinator 310 and the various devices 321–325 through the optional contention access period 1030, the management time slots 1050, or both. For example, this can involve information about new devices that want to join the network 300. The particular implementation will determine what particular option is used: it could include a contention access period 1030, one or more management time slots 1050, or some combination of both.

Individual devices 310, 321–325 transmit frames during the contention free period 1040 according to the schedule set forth in the beacon 1020. The pair of devices 310, 321–325 assigned to a given guaranteed time slots 1060 use that GTS 1060 assigned to them to transmit frames 1070 between each other. These may be data frames from the designated transmitter to the designated receiver, or acknowledgement (ACK) frames from the designated receiver to the designated transmitter.

As noted above, guard times 1080 are preferably provided between frames to account for errors in clock accuracies and differences in propagation delays based on spatial positions of the devices 310, 321–325.

Cyclic Beacons

One problem in an ad hoc network 300 is coordinating the entry and departure of devices into and out of the network 300, and coordinating the passage of administrative frames between the coordinator 310 and the devices 321–325. The present invention addresses this problem by using cyclic beacons to monitor the network 300 and the devices 310, 321–325 in it. Each network preferably has a set number N of allowable devices 310, 321–325.

Controlling the Data Stream

One problem that can arise in networks 300 with multiple devices 310, 321–325 is that in the short term, some channel time allocations (CTAs) can be overloaded while others can be underused. This is because while CTAs (also known as GTSs) and data streams are dynamic, it takes time for them to be altered to fit changing channel time allocation needs. And in many applications, the amount of channel time needed for transmissions between two devices will vary from superframe to superframe.

The CTA assigned to a source-destination pair for a given set of transmissions is based on an estimate of the CTA required for that source-destination pair. However, it may turn out that for any specific CTA, transmissions between a source-destination pair are either backed up or remain unused or underused.

One way to alleviate this problem is to make use of the unused or underused CTAs to pass data that has overflowed its assigned CTA. This can reduce the number of data logjams and increase the system's transmission rate by allowing the use of some unused channel time to send waiting data packets.

In operation this is accomplished by allowing the assigned transmitting (source) device to send data to any receiving (destination) device that it knows will be listening during a given CTA, regardless of whether that receiving device was specifically assigned as the destination for that CTA. The assigned source device is preferably the only device that can transmit during the allocated channel time. This will prevent collisions from occurring by making certain that no two devices 310, 321–325 will try and transmit at the same time. The source device will preferably be identified when the CTA is assigned by a source device ID (i.e., a unicast address) that corresponds to the device ID for one of the devices 310, 321–325 in the network 300.

The source device can determine which devices 310, 321–325 are listening during a given CTA by considering two sets of devices: those that must listen to the CTA, and those that voluntarily listen during the CTA. One reason that some devices 310, 321–325 will not be listening is that they will periodically enter sleep modes to conserve power when they are not required to listen.

The set of devices 310, 321–325 that must listen to the CTA is simple to determine. It includes that device or devices 310, 321–325 that are assigned as the destination device for that CTA, as indicated by the destination device ID when the CTA is assigned. As noted above, this destination device ID can be a unicast address, a multicast address, or a broadcast address. The particular address used will tell the devices in the system who must listen to that CTA. In other words, if a unicast address is used, the device 310, 321–325 belonging to that unicast address must listen during that unicast CTA. Similarly, if the multicast address is used, all devices 310, 321–325 associated with that particular multicast (as indicated by the associated multicast stream identifier) must listen during that multicast CTA. Likewise, if the broadcast address is used, all devices 310, 321–325 in the network 300 must listen during that broadcast CTA.

The set of devices 310, 321–325 that may listen to the CTA depends entirely on the individual devices 310, 321–325, since each may elect to listen to more CTAs than are strictly necessary. For example, some devices may listen to all multicast CTAs. Other devices might listen to all transmissions from a particular device (e.g., a transmitting device that the current device is receiving data from in a different part of the superframe 500). Still other devices 310, 321–325 may listen to all CTAs. And, of course, some devices 310, 321–325 may listen to only the CTAs that they are specifically required to. Generally this is an issue of power consumption. Devices 310, 321–325 that are less constrained by power can listen to more CTAs than devices 310, 321–325 that must conserve their power supply. Each device will preferably identify its receiving mode (i.e., which extra CTAs it will listen to) when it joins the network.

Thus, for any given CTA there will be a single source device authorized to transmit, one or more destination devices that are assigned to listen, and possible one or more devices that elect to listen.

Generally the source device will transmit frames to the assigned destination device or devices. However, as noted above, sometimes it will have nothing it needs to transmit to the assigned destination device(s). But it may well have something it needs to transmit to a secondary destination device (i.e., one not assigned as a destination in the current CTA). And if that secondary destination device is listening during the current CTA, the source device can start a unicast stream to send information to the secondary destination device.

In some cases it may also happen that the source device sends frames to the assigned destination during the current CTA, but finishes transmitting before the end of the CTA. In that case if the source device has something that it needs to send to a listening secondary destination device that will fit in the remaining part of the CTA, then the source device can start a new unicast stream to send information to the secondary destination device.

Therefore, each device need only determine which devices are listening during a given channel time allocation to determine who is available as a recipient for these secondary data streams. This information is preferably maintained at the coordinator 310, which receives the information from each device 321–325 when they first associate with the network 300. In one preferred embodiment, the receiving mode for each device can be sent in an association request in a device capabilities field.

It should be noted, however, that using broadcast CTAs to send unicast streams could be very inefficient since all devices must listen to these CTAs. However, in cases where no devices in the network are concerned about power consumption, this will not be as great a concern.

In an effort to maximize both power efficiency and data transmission, a battery-powered device will usually be programmed to not report its capability as listen-to-all (i.e., that it will listen to all CTAs), listen-to-all-source (i.e., that it will listen to all CTAs from a given device), or listen-to-all-multicast (i.e., that it will listen to all multicast CTAs). Therefore, when talking to a battery-powered device, the transmitting device will generally ask for a unicast CTA. However, a device connected to a non-battery power source will more likely report its capability as either listen-to-all, listen-to-all-source, or listen-to-all-multicast.

Figure 11:
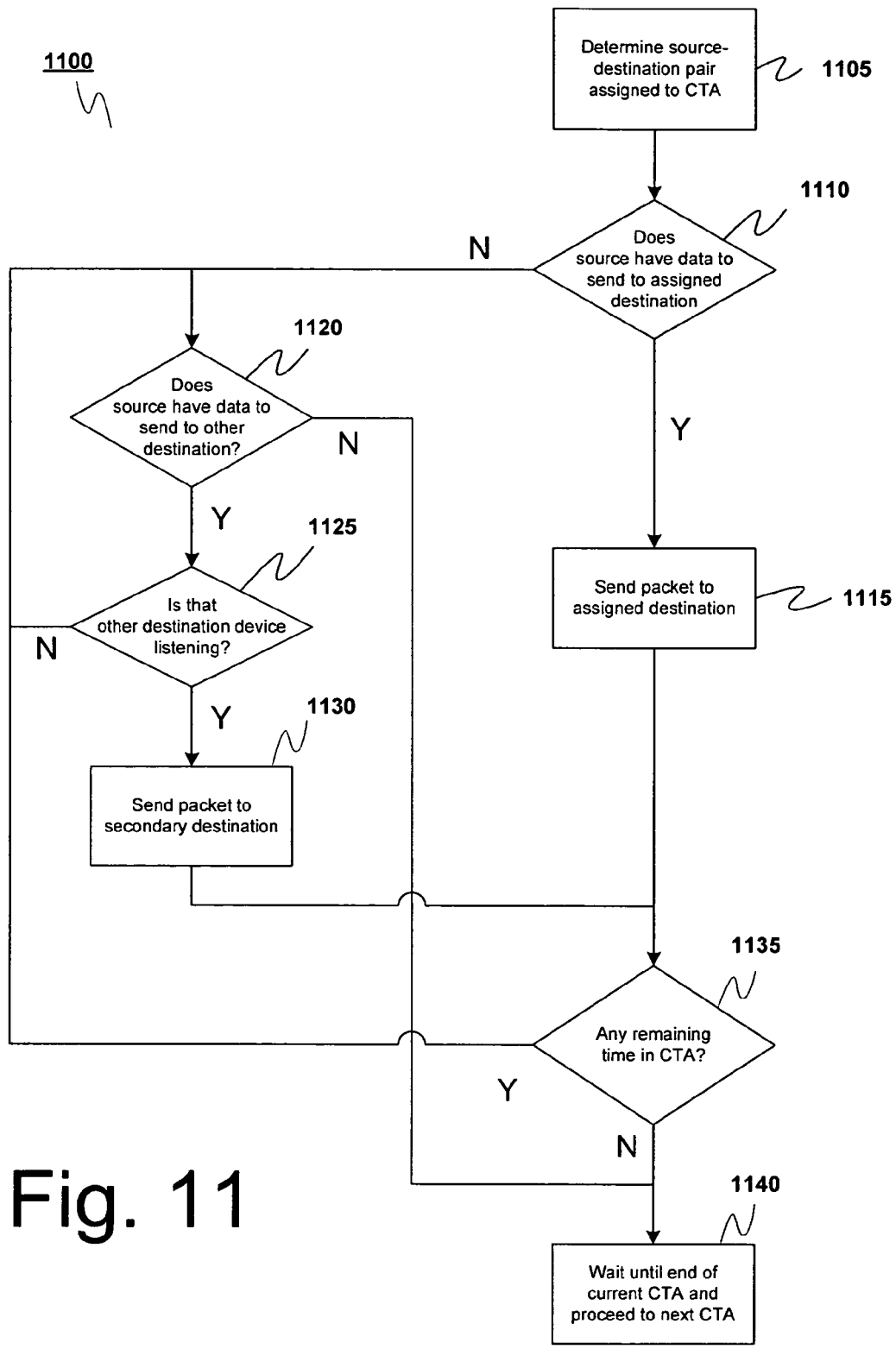
FIG. 11 is a flow chart showing a data stream control process according to a preferred embodiment of the present invention.

FIG. 11 is a flow chart showing a data stream control process according to a preferred embodiment of the present invention. As shown in FIG. 11, the process begins when network 300 determines the source-destination pair assigned to a given CTA. (Step 1105) this is preferably done by reading the beacon for the superframe.

The assigned source device then determines whether it has anything it needs to send to the assigned destination (keeping in mind that the destination can be a single device or multiple devices). (Step 1110)

If the assigned source device has data to send to the assigned destination, then it proceeds to do so, taking up as much of the CTA as it needs. (Step 1115)

If the assigned source device does not have any data it needs to send to the assigned destination, then it determines whether it has any data that it needs to send to a secondary destination device (i.e., one not assigned to the CTA). (Step 1120)

If the assigned source device has no other data that it needs to send to any other device in the network 300, then the source device waits until the end of the CTA and the network moves onto the next CTA. (Step 1140)

If the assigned source device does have data that it needs to send to a secondary device, then it next needs to determine whether that secondary device is listening to the current CTA. (Step 1125) Preferably, each device will maintain a list of all potential listening devices and what their listen modes are (i.e., which extra CTAs they will listen to).

If the secondary device is listening, then the assigned source device sends the data to the assigned destination, taking up as much of the CTA as it needs. (Step 1130)

If, however, the secondary device is not listening to the current CTA, then the source device proceeds back to step 1120 to determine whether it has data that it needs to send to any other secondary destination device.

Once the assigned source device sends data (whether to the assigned destination device in step 1115 or to a secondary destination device in step 1130), the assigned source device determines whether there is any remaining time in the CTA. (Step 1135)

If there is remaining time, then the assigned source device proceeds to step 1120 to determine whether it has any data it needs to send to any other secondary destination devices. If there is no remaining time, then the assigned source device proceeds to step 1140 and the CTA ends.

Conclusion

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://www.ieee802.org/15/pub/TG3.html. Nothing in this disclosure should be considered to be incompatible with the draft 802.15.3 standard, as set forth on the IEEE 802 LAN/MAN Standards Committee web page.

Thus, one preferred embodiment of the present invention is used in an ultrawide bandwidth network. However, it is applicable to other sorts of networks as well.

Obviously, numerous modifications and variations of the present invention are possible in light of the above teachings. It is therefore to be understood that within the scope of the appended claims, the invention may be practiced otherwise than as specifically described herein.

What is claimed is:

1. A method of transmitting data packets from a source device in a wireless network, comprising:
   receiving a channel time allocation assignment at the source device, the channel time allocation assignment indicating: an assigned channel time allocation, a source address indicating that the source device is assigned to transmit dining the assigned channel time allocation, and a destination address indicating that a destination device is assigned to listen during the assigned channel time allocation;
   performing a first determining step to determine whether the source device has primary data to send to the destination device;
   sending primary data from the source device to the destination device during the assigned channel time allocation if the first determining step determines that the source device does have primary data to send;
   performing a second determining step to determine whether any time remains in the assigned channel time allocation after the step of sending primary data;
   performing a third determining step to determine whether the source device has secondary data to send to a secondary device not assigned as the destination device if the second determining step determines that time remains in the assigned channel time allocation;
   performing a fourth determining step to determine whether the secondary device is listening during the assigned channel time allocation if the third determining step determines that the source device has secondary data to send to the secondary device; and
   sending secondary data from the source device to the secondary device during the assigned channel time allocation if the fourth determining step determines that the source device does have secondary data to send.

2. A method of transmitting data packets from a source device in a wireless network, as recited in claim 1, further comprising:
   performing a fifth determining step to determine whether any time remains in the assigned channel time allocation after the step of sending secondary data; and
   repeating the second, third, and fourth determining steps as well as the step of sending secondary data if the fifth determining step determines that time remains in the assigned channel time allocation.

3. A method of transmitting data packets from a source device in a wireless network, as recited in claim 1,
   wherein the source device maintains a device listening mode list of all network device, the device listening mode list indicating a listening mode that each network device is currently operating in, and
   wherein the third determining step is performed by having the source device look up the secondary device in the device listening mode list.

4. A method of transmitting data packets from a source device in a wireless network, as recited in claim 3, wherein the listening modes include a listen-to-all mode indicating a policy of listening to all possible channel time allocations regardless of their assigned destination address.

5. A method of transmitting data packets from a source device in a wireless network, as recited in claim 3, wherein the listening modes include a listen-to-multicast mode indicating a policy of listening to all possible channel time allocations that are assigned to a multicast address as the destination address.

6. A method of transmitting data packets from a source device in a wireless network, as recited in claim 3, wherein the listening modes include a listen-to-source mode indicating a policy of listening to all possible channel time allocations that are assigned to a set unicast address as the destination address.

7. A method of transmitting data packets from a source device in a wireless network, comprising:
   receiving a channel time allocation assignment at the source device, the channel time allocation assignment indicating: an assigned channel time allocation, a source address indicating that the source device is assigned to transmit during the assigned channel time allocation, and a destination address indicating that a destination device is assigned to listen during the assigned channel time allocation;
   performing a first determining step to determine whether the source device has primary data to send to the destination device;
   sending primary data from the source device to the destination device during the assigned channel time allocation if the first determining step determines that the source device does have primary data to send;
   performing a second determining step to determine whether any time remains in the assigned channel time allocation after the step of sending primary data;
   performing a third determining step to determine which non-destination devices are listening during the assigned channel time allocation if the second determining step determines that time remains in the assigned channel time allocation;
   performing a fourth determining step to determine whether the source device has secondary data to send to a secondary device if the third determining step determines that at least one of the non-destination devices will be listening during the assigned channel time allocation, the secondary device being one of the non-destination devices that will be listening during the assigned channel time allocation; and
   sending secondary data from the source device to the secondary device during the assigned channel time allocation if the fourth determining step determines that the source device does have secondary data to send.

8. A method of transmitting data packets from a source device in a wireless network, as recited in claim 7, further comprising:
   performing a fifth determining step to determine whether any time remains in the assigned channel time allocation alter the step of sending secondary data; and
   repeating the second, third, and fourth determining steps as well as the step of sending secondary data if the fifth determining step determines that time remains in the assigned channel time allocation.

9. A method of transmitting data packets from a source device in a wireless network, as recited in claim 7,
   wherein the source device maintains a device listening mode list of all network devices, the device listening mode indicating a listening mode that each device is currently operating in, and
   wherein the third determining step is performed by having the source device look up the secondary device in the device listening mode list.

10. A method of transmitting data packets from a source device in a wireless network, as recited in claim 9, wherein the listening modes include a listen-to-all mode indicating a policy of listening to all possible channel time allocations regardless of their assigned destination address.

11. A method of transmitting data packets from a source device in a wireless network, as recited in claim 9, wherein the listening modes include a listen-to-multicast mode indicating a policy of listening to all possible channel time allocations that are assigned to a multicast address as the destination address.

12. A method of transmitting data packets from a source device in a wireless network, as recited in claim 9, wherein the listening modes include a listen-to-source mode indicating a policy of listening to all possible channel time allocations that are assigned to a set unicast address as the destination address.

* * * * *

UNITED STATES PATENT AND TRADEMARK OFFICE
CERTIFICATE OF CORRECTION

| | | |
|---|---|---|
| PATENT NO. | : 7,088,702 B2 | Page 1 of 1 |
| APPLICATION NO. | : 10/680489 | |
| DATED | : August 8, 2006 | |
| INVENTOR(S) | : William M. Shvodian | |

It is certified that error appears in the above-identified patent and that said Letters Patent is hereby corrected as shown below:

Column 19, Line 8, Claim No. 1:
    Change "dining" to --during--.

Signed and Sealed this

Seventh Day of August, 2007

JON W. DUDAS
*Director of the United States Patent and Trademark Office*